Figure 1:
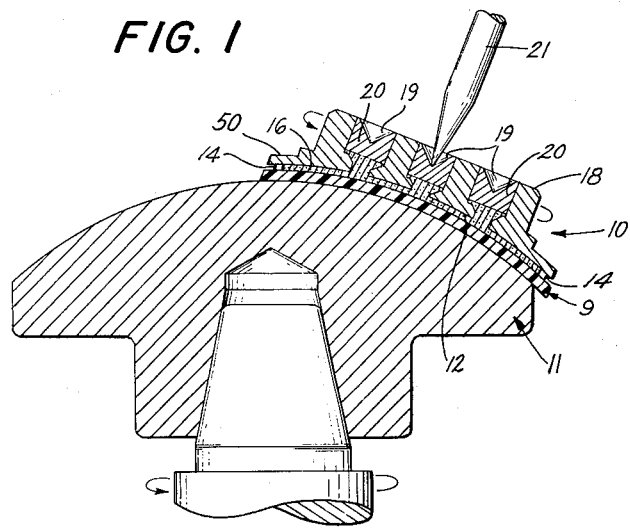

July 14, 1964 G. A. BEASLEY 3,140,568
LENS BLOCKING DEVICE
Filed Feb. 28, 1963 2 Sheets-Sheet 1

INVENTOR.
GEORGE A. BEASLEY
BY
Kane, Dalsimer and Kane
ATTORNEYS

July 14, 1964  G. A. BEASLEY  3,140,568
LENS BLOCKING DEVICE
Filed Feb. 28, 1963  2 Sheets-Sheet 2

INVENTOR.
GEORGE A. BEASLEY
BY
Kane, Dalsimer and Kane
ATTORNEYS

United States Patent Office 3,140,568
Patented July 14, 1964

3,140,568
LENS BLOCKING DEVICE
George A. Beasley, Fort Lauderdale, Fla., assignor to Univis, Inc., Fort Lauderdale, Fla., a corporation of Ohio
Filed Feb. 28, 1963, Ser. No. 261,644
3 Claims. (Cl. 51—216)

This invention relates to an improved lens blank blocking device, and more particularly to an improved blocking device for use with plastic lens blanks.

Heretofore, plastic lens blanks of the ophthalmic type, both single vision and multi-focal, generally have been blocked on conventional lens blocks in order to grind and polish or form a prescription curve. Blocking in this fashion has generally resulted in an inferior quality of curve or formed surface due to certain conditions and limitations imposed by the conventional lens blocks. Thus, where the conventional type of lens block is employed, there is generally an uneven thickness of blocking pitch or blocking wax material between the lens blank and block which usually results in uneven shrinkage, and this in turn produces distortion of the relatively flexible plastic blank. Furthermore, the conventional glass lens block usually covers only a portion of the lens blank which is satisfactory for the more rigid glass lenses. However, a block of this type fails to provide adequate support for the less rigid plastic lens blanks with the result that an outline of the block and blocking material is impressed in the plastic lens blanks due to the plastic memory of most plastic materials used for lenses. A further difficulty resulting from this type of blocking is that the plastic lens blank can be readily bumped against the curve-forming apparatus, and this tends to separate the plastic lens blank from the pitch or wax holding it to the block.

It is a primary object of the present invention to overcome the difficulties and disadvantages heretofore encountered and to provide an improved blocking device for blocking single vision and multi-focal plastic lens blanks of the ophthalmic type while prescription curves are formed thereon in which the plastic lens is mounted on the blocking device so that a uniform layer of pitch or other similar bonding material is provided between the lens blank and the block, thus preventing uneven shrinkage and distortion, and which provides adequate support for the entire area of the lens blank, thereby preventing the blocking device from impressing itself into a portion of the plastic lens blank and also serving to protect the plastic lens blank from bumping against the forming apparatus.

A further object is the provision of an improved lens blocking device of the above character which is of relatively simple and inexpensive construction and in which the lens blanks may be readily blocked thereon and which may be mounted in conventional forming or generating apparatus so that the desired curve may be formed on the lens blank.

In carrying out my invention, I provide an improved lens blocking device having a blocking body formed with a lens blank supporting surface with a curvature conforming generally to the curvature of the finished surface of the lens blank to be supported thereon so that the finished surface of the lens blank can be bonded thereto by optical pitch or other similar bonding and supporting material. Projecting from the supporting surface of the blocking body adjacent its peripheral edge are lens blank spacing and positioning means of substantially uniform height and arranged so as to be engageable with the finished surface of the lens blank at least at three spaced points thereof to thereby maintain the fiinished surface of the lens blank in parallel, equally spaced relationship with respect to the corresponding portions of the supporting surface of the blocking body. Preferably, the area of the blocking body is at least co-extensive with the area of the lens blank to be supported thereon.

Figure 2:
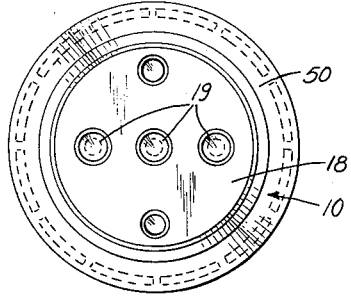
Figure 3:
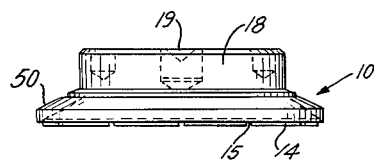
Figure 4:
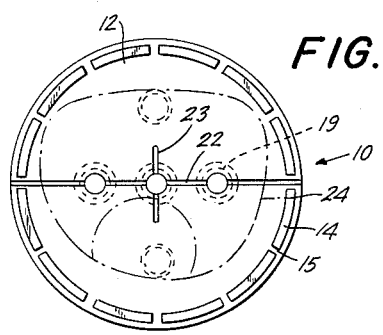
Figure 5:
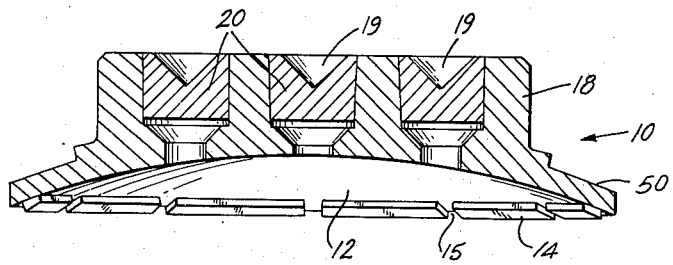
Figure 6:
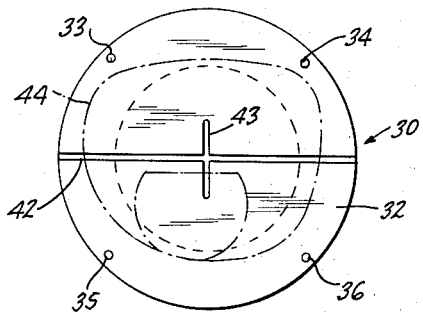
Figure 7:
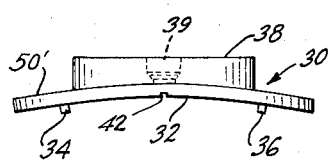
Figure 8:
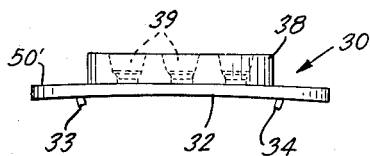

In the accompanying drawings:
FIG. 1 is an elevational, sectional view showing one form of my improved blocking device having a lens blank affixed thereto and applied to a surfacing tool to form a prescription curve thereon;
FIG. 2 is a plan view of the blocking device shown in FIG. 1 showing the back face thereof;
FIG. 3 is a side elevational view of the blocking device of FIG. 1;
FIG. 4 is a plan view showing the front face of the blocking device with the relative position and area of a lens to be formed from the lens blank outlined in broken lines;
FIG. 5 is a cross-sectional view of the blocking device shown in FIG. 1;
FIG. 6 is a plan view showing the front face of a modified form of blocking device with the relative position and area of a lens to be formed from the lens blank outlined in broken lines;
FIG. 7 is a side elevational view of the modified form of blocking device as viewed from either the left or right hand side of FIG. 6; and
FIG. 8 is a side elevational view of the modified form of blocking device as viewed from either the upper or lower side of FIG. 6.

In both of the illustrated forms of my invention my improved blocking device comprises a blocking body formed on its front face with a lens blank supporting surface with a curvature conforming generally to the curvature of the finished surface of the of the lens blank to be mounted thereon. Adjacent the periphery of the lens supporting surface I provide an outwardly projecting lens blank seat or spacing and positioning means of uniform height for engaging the finished surface of the lens blank at least at three spaced points. The back face of the blocking device is preferably formed with suitable mounting means for mounting the blocking device in generating apparatus.

My improved blocking devices are particularly suitable for use with plastic lens blanks of the ophthalmic type, either single vision or multi-focal, which are provided with one finished surface and one unfinished surface on which a prescription curve is to be formed. Plastic lens blanks of this type are known in the industry and are made from suitable plastic materials having good optical qualities. A lens blank is shown at 9 in FIG. 1 supported on my improved blocking device 10 so as to be engaged by the surfacing tool 11.

Referring to the first five figures of the drawings, my improved blocking device 10 comprises a body portion formed with front and rear faces respectively. The body portion may be made of any suitable material, such as metal, although under certain circumstances it may also be made of glass.

The front face of the body portion is formed with a lens blank supporting surface 12 which is curved to conform generally to the curvature of the finished surface of the lens blank to be mounted thereon. Projecting outwardly from the lens blank supporting surface of the blocking body adjacent the periphery thereof is a lens blank seat or a lens blank spacing and positioning means, as indicated at 14. This seat or spacing and positioning means is of substantially uniform height and is arranged so as to be engageable with the finished surface of the lens blank at least at three points thereof to thereby maintain the finished surface of the blank in parallel and equally spaced relationship with respect to corresponding portions of the supporting surface of the blocking body.

In the form of blocking device shown in FIGS. 1–5 the seat or spacing and positioning means takes the form of an annular rim positioned adjacent the peripheral edge of the supporting surface of the blocking body and extending around a major portion thereof. It is interrupted at regular intervals by small gaps or spaces, as shown at 15.

The finished surface of the lens blank to be mounted on the blocking body rests against the seat or positioning and spacing means 14 and is held in place by optical pitch or blocking wax or other similar bonding and supporting material as shown at 16 in FIG. 1. In applying the lens blank to the blocking body, a surplus of pitch or other bonding material is interposed between the finished surface of the blank and the supporting surface of the blocking body, and the lens blank is pressed against the seat 14. The surplus pitch is forced outwardly between the gaps or spacers 15, leaving only a uniform layer of sufficient thickness to hold the lens blank in place and support it uniformly.

Because the layer of pitch is of uniform thickness, there will be no uneven shrinkage and no distortion resulting therefrom. Also because the lens blank does not project outwardly beyond the edges of the blocking body, it cannot be bumped against the generating apparatus in such a fashion as to urge it away from the pitch and blocking body. Because the blocking body is not smaller in area than the lens blank, it will not impress itself therein so as to cause further distortion of the lens blank.

The back or rear face of the blocking body is formed with a projecting portion 18 cooperable to fit in the chuck of a generating apparatus so that the blocking body may be mounted therein. The projecting portion is also formed with centering and aligning apertures 19 whereby the chuck may be properly centered and the axes of the lens may be properly aligned in the generating apparatus. The aligning and centering apertures 19 may be provided with steel linings 20 which are engaged by centering and aligning pins 21 of the generating apparatus.

The lens blank supporting surface on the front face of the blocking body is provided with a pair of grooves 22 and 23 intersecting each other at right angles. The point of intersection is preferably the optical center of the lens to be mounted on the blocking body. It will be noted that the groove 22 is substantially longer than the grove 23 and extends across an entire diameter of the blocking body. The groove 22 preferably represents the cylinder axis of the lens blank and the axis marking on the lens blank is brought in alignment therewith at the time that the lens blank is mounted on the blocking body. The groove 22, in turn, is in fixed relationship with the centering and aligning apertures 19 on the back face of the blocking body. In the illustrated embodiment it will be noted that the groove 22 is in direct alignment with these apertures. Thus, it will be seen that in mounting the blocking body in the chuck of the generating apparatus the relative angle of the cylinder axis of the lens blank can be readily controlled.

As previously indicated, my improved lens blocking device is particularly suitable for use in generating or forming a prescription curve on the unfinished surface of a lens blank of the type having a finished surface and an unfinished surface. Plastic lens blanks of this type are generally larger in area than the finished lens to be formed therefrom. Thus, by referring to FIG. 4, the broken line 24 outlines the area of the lens to be formed from the lens blank which is co-extensive in area with the area of the blocking body. It should be noted that the finished lens area falls entirely within the limits defined by the lens blank seat or positioning and spacing means 14. Thus, the lens blank seat or positioning and spacing means engages the finished surface of the lens blank outside the area of the finished lens to be formed therefrom. In this way, no marring, scratching or other damage can be caused to the finished surface of the lens. It will be understood that after the prescription surface has been formed on the unfinished surface of the lens blank the lens is cut from the lens blank along the line indicated at 24.

Also, it should be noted that the lens outlined at 24 in FIG. 4 is of the bifocal type. As previously indicated, my improved blocking device is suitable for use either with single vision or multi-vision lens blanks. The lens seat or positioning and spacing means 14 should be of sufficient height to accommodate the projecting surface of the bifocal or multi-focal area of the lens blank when a lens blank of that type is employed.

In FIGS. 6, 7 and 8 I have shown a modified type of blocking device in which the lens blank seat or positioning and spacing means is in the form of a plurality of equally spaced lugs disposed around the peripheral portion of the supporting surface. Thus, I have shown a blocking body 30 made of suitable material, such as metal, and having a front face and a rear or back face.

The front face is formed with a similar lens supporting surface conforming in curvature with the curvature of the finished surface of the lens blank, as indicated at 32. The lugs forming the lens blank seat may vary in number, but there should be at least three lugs, preferably equally spaced from each other and from the center of the supporting surface. As in the first form of my invention, the lugs should be of uniform height and should engage the finished surface of the lens blank outside of the area of the finished lens so as to support the finished surface of the lens blank in parallel, equally spaced relationship from the corresponding portions of the supporting surface of the blocking body.

The lens blank blank is held in place by a layer of optical pitch or blocking wax or other similar bonding and supporting material interposed between the finished surface of the lens blank and the supporting surface of the blocking body. In this connection, in applying the lens blank a surplus of pitch is interposed between the two surfaces and the lens blank is pressed into engagement with the lugs with the result that any surplus pitch is forced outwardly between the peripheral edges of the lens blank and blocking body. Thus, a uniform layer of pitch is provided to hold the lens blank in place and lend support thereto, thereby preventing uneven shrinkage and any distortion that might result therefrom.

In addition, the blocking body is at least co-extensive in area with the lens blank supported thereon so as to protect the lens blank from being bumped against the generating apparatus in a manner to cause it to shift away from the pitch and the blocking body.

In the particular arrangement shown in FIGS. 6, 7 and 8 I have provided four equally spaced rectangularly arranged lugs 33, 34, 35 and 36. This type of arrangement is particularly suitable for supporting a lens blank having a finished toric surface. The cylinder axis is arranged parallel to one of the rectangular sides defined by the lugs. It will be seen from the different curvatures of the two axes shown by the side elevations, FIGS. 7 and 8, that the lens supporting surface 32 is a toric surface. The cylinder axis in this instance runs transversely of the surface, as viewed in FIG. 6, parallel to the sides defined by the two lugs 33 and 34 and the two lugs 35 and 36.

I prefer to use projecting lugs arranged in this fashion as the lens blank seat when supporting a toric lens blank because one blocking device can accommodate small variations in toric surfaces and it is not necessary to provide a separate blocking device for each specific toric cusve.

The back face of the modified form of blocking device shown in FIGS. 6, 7 and 8 has a projecting portion 38 similar to the projecting portion 18 in the first form of blocking device. This projecting portion can be accommodated in the chuck of generating apparatus for rotary and oscillating motion. Suitable aligning and centering apertures 39 may be provided in the projecting portion as in the first form of my invention.

Suitable grooves 42 and 43 may be formed in the supporting surface of the front face of the blocking body as shown so as to intersect at right angles at the approximate optical center of the lens. The groove 42 defines the cylinder axis of the surface. In assembling the lens blank with the blocking body, the cylinder axis marking on the lens blank is aligned with the groove 42.

As in the first form of my invention, the lugs 33, 34, 35 and 36 forming the lens seat are arranged to engage the finished surface of the lens blank outside the area of the finished lens which is indicated in broken lines at 44 in FIG. 6.

In both of the illustrated embodiments it will be seen that the lens blank spacing and positioning means 14 and 33–36 are of uniform height and are arranged to engage the lens blank outside the area of the finished lens at least at three points to thereby maintain the finished surface of the lens blank in uniformly spaced substantially parallel relationship with respect to the supporting surface of the blocking body. In this connection, the spacing and positioning means may consist of spaced members engaging the lens blank surface at spaced points or may be in the form of a continuous member engaging the surface of the lens blank along a continuous line of contact necessarily including within it a plurality of points. The expression "at least at three points" contemplates either continuous contact of this type or spaced points of contact. If a continuous member is employed, then an escape route for the optical pitch or wax is preferably provided in the form of one or more channels through the member.

In using either form of my improved blocking device, a semi-finished plastic lens blank of the type having one finished surface and one unfinished surface to which a prescription curve is to be applied is mounted on the blocking body with the finished surface in confronting relationship with the curved supporting surface of the blocking body. The lens body is held in place by means of optical pitch blocking wax or other similar bonding and supporting material with the finished surface of the blank in engagement with the lens blank seat or the positioning and spacing means. In this way a uniform layer of pitch is provided between the lens blank and blocking body, thereby preventing uneven shrinkage and any distortion resulting therefrom.

In assembling the lens blank with the blocking body, the cylinder axis marking on on the lens blank should be brought into alignment with the longer axis defining groove of the supporting surface of the blocking body.

The blocking device, with the lens blank blocked thereon, is then suitably mounted in a generating machine with the cylinder axis disposed at the proper relative angle. The surplus stock or material on the lens blank is then removed and the final surface contour generated at the desired finished thickness by operating the generating equipment in the conventional manner. Alternatively, the blank can be reduced to the desired surface shape and thickness by using the old hand grinding methods. In this connection the back faces of both forms of blocking devices are provided with reference surfaces 50 and 50' which are accurately machined and are uniformly spaced from the top surfaces of the lens blank spacing and positioning means. The block is referenced against the reference surface for location in the generating apparatus. The optical center position can also be controlled by calipering the assembly of lens blank plus pitch plus blocking device, at various points around the periphery.

When the prescription surface has been properly formed and finished, the lens blank can then be deblocked from the blocking device and the lens cut therefrom along the broken lines indicated in FIGS. 4 and 6.

It will thus be seen that I have provided an improved blocking device particularly suitable for blocking plastic lens blanks of the type having one finished and one unfinished surface in which the lens blank is properly supported thereon so as to prevent distortion and in which the blocking device is at least co-extensive in area with the lens blank so as to afford protection against bumping the lens blank and also so as to prevent the blocking device from impressing itself into the lens blank and causing further distortion thereof.

It should be understood that modifications may be made in the illustrated and described embodiments of my invention without departing from the invention as set forth in the accompanying claims.

I claim:
1. An improved blocking device for use with a plastic lens blank which is substantially no larger in circumference than the blocking device of the type having one finished surface and one unfinished surface for the purpose of supporting the blank while a perscription curve is formed on the unfinished surface, said blocking device comprising: a blocking body formed with a lens blank supporting surface with a curvature conforming generally to the curvature of the finished surface of the lens blank to be supported thereon so that the finished surface of the lens blank can be bonded thereto and supported thereon by a thin layer of bonding and supporting material of uniform thickness, and lens blank spacing and positioning means mounted on and projecting from the supporting surface of the blocking body adjacent peripheral edge portions thereof, said spacing and positioning means being of uniform height so as to be engageable with the finished surface of the lens blank at least at three points thereof to thereby maintain all portions of the finished surface in substantially parallel and equally spaced relationship with corresponding portions of the supporting surface of the blocking body.

2. An improved blocking device for use with a lens blank as set forth in claim 1 in which the lens blank spacing and positioning means includes a projecting rim extending around the supporting surface of the lens body adjacent the periphery thereof and having a plurality of spaced gaps extending therethrough.

3. An improved blocking device for use with a lens blank as set forth in claim 1 in which the lens blank spacing and positioning means includes a plurality of separate projecting lugs.

References Cited in the file of this patent
UNITED STATES PATENTS

| | | |
|---|---|---|
| 2,224,168 | Tillyer et al. | Dec. 10, 1940 |
| 2,603,922 | McCarthy et al. | July 22, 1952 |
| 2,748,548 | Hilsinger | June 5, 1956 |
| 2,859,568 | Dantzic | Nov. 11, 1958 |